US012679093B2

(12) United States Patent
Amari et al.

(10) Patent No.: US 12,679,093 B2
(45) Date of Patent: Jul. 14, 2026

(54) LIQUID DISCHARGE MODULE, LIQUID DISCHARGE HEAD, AND LIQUID DISCHARGE APPARATUS

(71) Applicants: Kiyoshi Amari, Kanagawa (JP); Hisayoshi Ohshima, Kanagawa (JP); Shinji Aoki, Kanagawa (JP)

(72) Inventors: Kiyoshi Amari, Kanagawa (JP); Hisayoshi Ohshima, Kanagawa (JP); Shinji Aoki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 140 days.

(21) Appl. No.: 18/716,153

(22) PCT Filed: Nov. 15, 2022

(86) PCT No.: PCT/IB2022/060954
§ 371 (c)(1),
(2) Date: Jun. 4, 2024

(87) PCT Pub. No.: WO2023/126708
PCT Pub. Date: Jul. 6, 2023

(65) Prior Publication Data
US 2025/0033356 A1 Jan. 30, 2025

(30) Foreign Application Priority Data
Dec. 28, 2021 (JP) ................................ 2021-214259

(51) Int. Cl.
*B41J 2/14* (2006.01)
*B41J 2/16* (2006.01)

(52) U.S. Cl.
CPC ........... *B41J 2/1429* (2013.01); *B41J 2/1615* (2013.01); *B41J 2/1623* (2013.01); *B41J 2002/14193* (2013.01)

(58) Field of Classification Search
CPC .... B41J 2/1429; B41J 2/1615; B41J 2/14201; B41J 2202/05
See application file for complete search history.

(56) References Cited

U.S. PATENT DOCUMENTS 4,723,131 A * 2/1988 Droit .......................... B41J 2/14 118/313
5,144,332 A 9/1992 Okuie
(Continued)

FOREIGN PATENT DOCUMENTS

CA 2371024 C * 12/2005 .......... B41J 2/17509
CN 103917300 A 7/2014
(Continued)

OTHER PUBLICATIONS

International Search Report and Written Opinion issued on Feb. 7, 2023 in PCT/IB2022/060954 filed on Nov. 15, 2022, 12 pages.
(Continued)

*Primary Examiner* — Sharon Polk
(74) *Attorney, Agent, or Firm* — XSENSUS LLP

(57) ABSTRACT

A liquid discharge module includes a valve body configured to openably close a nozzle; a driving body configured to expand and contract in a longitudinal direction of the driving body; a holding body holding the driving body and supporting the valve body at one end of the holding body in the longitudinal direction; a housing having a cylindrical shape and accommodating the holding body; a fixing member contacting against another end of the holding body in the longitudinal direction and including a slotted groove having a gap extending in the longitudinal direction, the fixing member fixed to the housing; and an expansion member configured to widen the gap of the slotted groove to fix an outer peripheral face of the fixing member to an inner peripheral face of the housing.

20 Claims, 10 Drawing Sheets

(56) References Cited

U.S. PATENT DOCUMENTS

| | | | |
|---|---|---|---|
| 2012/0105522 A1 | 5/2012 | Wallsten et al. | |
| 2013/0241983 A1 | 9/2013 | Aoki et al. | |
| 2014/0071196 A1 | 3/2014 | Hihara et al. | |
| 2018/0333958 A1 | 11/2018 | Midorikawa et al. | |
| 2020/0039217 A1 | 2/2020 | Kaiba et al. | |

FOREIGN PATENT DOCUMENTS

| | | | | |
|---|---|---|---|---|
| EP | 2734371 B3 * | 8/2023 | ................ | B41J 2/04 |
| JP | H02-274550 A | 11/1990 | | |
| JP | 2013-212452 A | 10/2013 | | |
| JP | 2020-023177 A | 2/2020 | | |
| WO | 2019/042586 A1 | 3/2019 | | |
| WO | 2021/191728 A1 | 9/2021 | | |

OTHER PUBLICATIONS

Office Action issued Mar. 4, 2026 in Chinese Patent Application No. 202280081518.5, 6 pages.

* cited by examiner

LIQUID DISCHARGE MODULE, LIQUID DISCHARGE HEAD, AND LIQUID DISCHARGE APPARATUS

CROSS-REFERENCE TO RELATED APPLICATIONS

This patent application is based on PCT filing PCT/IB2022/060954, filed Nov. 15, 2022, which claims priority to Japanese Patent Application No. 2021-214259, filed Dec. 28, 2021, the entire disclosure of each are hereby incorporated by reference herein.

TECHNICAL FIELD

The present embodiment relates to a liquid discharge module that uses a driving body such as a piezoelectric element, and also relates to a liquid discharge head and a liquid discharge apparatus including the liquid discharge module.

BACKGROUND ART

An example of an image forming apparatus including a liquid discharge apparatus includes an inkjet printer described in PTL 1 (Japanese Unexamined Patent Application Publication No. 2020-23177), etc. An inkjet head (liquid discharge head) of the liquid discharge apparatus is provided with nozzles for ejecting liquid droplets toward a recording medium. A valve body is arranged inside the nozzles, and a driving body (actuator) such as a piezoelectric element that expands and contracts in a longitudinal direction is coupled to the valve body.

The valve body is opened and closed by the expansion and contraction (vibration) of the driving body in the longitudinal direction, and when the valve body is opened, high-pressure ink is ejected as liquid droplets from the nozzles. The driving body is accommodated in a compressed state in a holding body that is elastically expandable and contractible in the longitudinal direction. The valve body is supported by and coupled with one end portion of the holding body in the longitudinal direction, and the other end portion of the holding body on the opposite side in the longitudinal direction is fixed to a housing of the inkjet head.

CITATION LIST

Patent Literature

[PTL 1]
Japanese Unexamined Patent Application Publication No. 2020-23177

SUMMARY OF INVENTION

Technical Problem

Conventionally, to adjust the amount of deformation of a valve body, in a liquid discharge module 330 of FIGS. 9A and 9B, a position of a fixing member 361 is adjusted in an axial direction (an up-down direction) at a side of a housing 310*b* against which another end portion of a holding body 370 in a longitudinal direction abuts (contacts), and the fixing member 361 is fixed by a bolt 362. However, it has been found that, even if relative positions of nozzles 302 and a valve body 331 are adjusted accurately and the bolt 362 is completely tightened, a discharge flow rate of liquid droplets varies.

That is, as illustrated in FIGS. 10A to 10C, the liquid discharge flow rate is determined by the valve opening and closing time and a displacement amount (stroke) of the valve body. The displacement amount (stroke) of the valve body corresponds to a displacement amount of the valve body necessary for the valve body to contact with the nozzle to close (seal) the nozzle in a displacement amount of the piezoelectric element generated when the drive voltage illustrated in FIG. 10A is applied to the piezoelectric element. Therefore, the displacement amount (stroke) of the valve body is determined by the displacement amount of the valve body (indicated as "valve displacement") when the displace amount of the piezoelectric element is the smallest. The "valve displacement" is indicated in a vertical axis in FIG. 10B.

The displacement amount of the valve body is determined by an adjusted position of the fixing member 361. However, the stroke changes when the bolt 362 is fixed after the adjusted position of the fixing member 361 is determined. This is because, when the bolt 362 is tightened, a plate-shaped head portion of the bolt 362 rubs against a side surface of the housing 310*b* and a distal end portion of the bolt 362 swings (rocks) in the axial direction. If the distal end portion of the bolt 362 swings (rocks) in the axial direction, the liquid discharge flow rate varies due to the change of the stroke.

Thus, it is an object of the present embodiment to provide a liquid discharge module that prevents a positional displacement of a fixing member fixing a position of a driving body.

Solution to Problem

A liquid discharge module includes a valve body configured to openably close a nozzle; a driving body configured to expand and contract in a longitudinal direction of the driving body; a holding body holding the driving body and supporting the valve body at one end of the holding body in the longitudinal direction; a housing having a cylindrical shape and accommodating the holding body; a fixing member contacting against another end of the holding body in the longitudinal direction and including a slotted groove having a gap extending in the longitudinal direction, the fixing member fixed to the housing; and an expansion member configured to widen the gap of the slotted groove to fix an outer peripheral face of the fixing member to an inner peripheral face of the housing.

Advantageous Effects of Invention

It is possible to prevent a positional displacement of a fixing member according to the present embodiment.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1A:
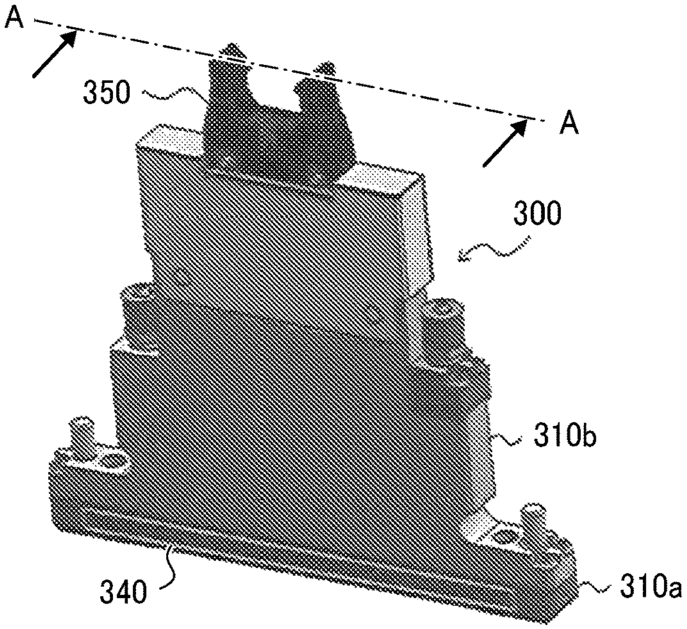
FIGS. 1A and 1B illustrate external explanatory views of a liquid discharge head according to the present embodiment.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below.

As used herein, the singular forms "a," "an," and "the" are intended to include the plural forms as well, unless the context clearly indicates otherwise.

[Liquid Discharge Head]

Figure 1B:
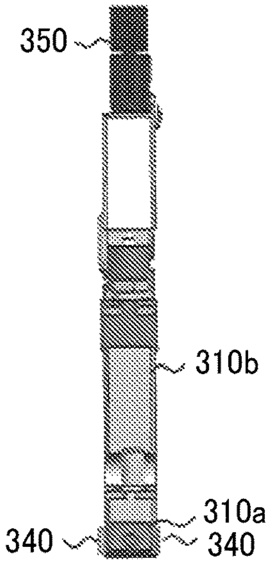

The present embodiment will be described below with reference to the drawings. FIGS. 1A and 1B illustrate external explanatory views of a liquid discharge head according to the present embodiment. FIG. 1A is an overall perspective view of the liquid discharge head, and FIG. 1B is an overall side view of the liquid discharge head.

A liquid discharge head 300 includes a housing 310*a* and a housing 310*b* provided to be joined to (stacked on) the housing 310*a*. The housing 310*a* is formed of a material such as a metal having high thermal conductivity, and the housing 310*b* is formed of a material such as a resin having low thermal conductivity.

The housing 310*a* includes a heater 340 on a front surface and a rear surface of the housing 310*a*. The temperature of the heater 340 is controllable and the heater 340 heats the housing 310*a*. The housing 310*b* includes a connector 350 used for communicating electrical signals, at an upper portion of the housing 310*b*.

Here, the housing 310*a* is an example of a first housing, and the housing 310*b* is an example of a second housing. The heater 340 is an example of a heating means. In the following description, the two housings may collectively be referred to as a housing 310.

Figure 2:
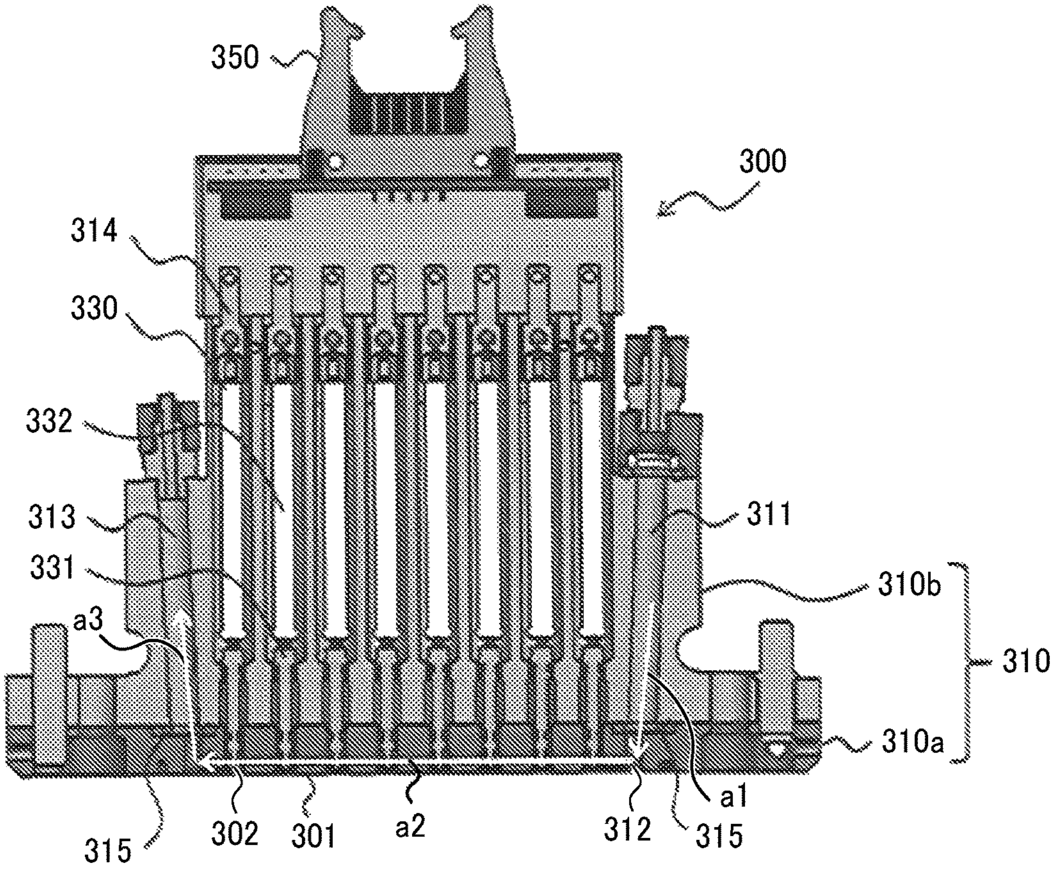
FIG. 2 is an overall cross-sectional view of the liquid discharge head according to the present embodiment.

FIG. 2 is an overall cross-sectional view (a cross-sectional view taken along line A-A indicated by arrows in FIG. 1A) of the liquid discharge head 300 according to the present embodiment. The housing 310*a* holds a nozzle plate 301 including nozzles 302 that discharge liquid droplets. The housing 310*a* further includes a channel 312 (a liquid supply portion) through which a liquid is fed from a side of a supply port 311 to a side of a collection port 313 via a portion above the nozzle plate 301.

The housing 310*b* includes the supply port 311 and the collection port 313 that are connected to the channel 312 of the housing 310*a*. Between the supply port 311 and the collection port 313, multiple liquid discharge modules 330 are arranged and the liquid discharge modules 330 discharge the liquid in the channel 312 from the nozzles 302 as liquid droplets.

[Liquid Discharge Module]

The number of the multiple liquid discharge modules 330 corresponds to the number of nozzles 302 provided in the housing 310*a*. A configuration described in the present example includes eight of the liquid discharge modules 330 corresponding to eight of the nozzles 302 arranged in a row. The number and the arrangement of the nozzles 302 and the liquid discharge modules 330 are not limited to the configuration described above.

For example, instead of a plurality of the nozzles 302 and the liquid discharge modules 330, one of the nozzles 302 and one of the liquid discharge modules 330 may be provided. Further, the nozzles 302 and the liquid discharge modules 330 may be arranged in a plurality of rows, instead of being arranged in one row.

In FIG. 2, reference numeral 315 denotes a sealing member provided in a joining portion between the housing 310*a* and the housing 310*b*. In the present example, an O-ring is used as the sealing member 315 to prevent liquid from leaking from the joining portion between the housing 310*a* and the housing 310*b*.

According to the above-described configuration, the supply port 311 takes in liquid (such as ink and coating material) in a pressurized state from the outside, feeds the liquid in a direction indicated by an arrow a1 in FIG. 2, and supplies the liquid to the channel 312. The channel 312 feeds the liquid from the supply port 311 in a direction indicated by an arrow a2. Subsequently, the collection port 313 collects, in a direction indicated by an arrow a3, liquid that is not discharged from the nozzles 302 arranged along the channel 312.

The liquid discharge modules 330 each include a valve body 331 that opens and closes the nozzles 302 and a piezoelectric element 332 as a driving body that drives the valve body 331. A voltage is applied to the piezoelectric element 332 to expand and contract the piezoelectric element 332 in a longitudinal direction. The housing 310*b* includes a regulating member 314 at a position facing an upper end portion of the piezoelectric element 332. The regulating member 314 abuts against (contacts with) the upper end portion of the piezoelectric element 332 and serves as a securing point of the piezoelectric element 332.

Here, the nozzle plate 301 is an example of a plate member, and the nozzle 302 is an example of a liquid discharge port. The valve body 331 is an example of a valve body, and the piezoelectric element 332 is an example of a driving body.

In the above-described configuration, if the piezoelectric element 332 is operated to move the valve body 331 upward, the nozzles 302 that are closed by the valve body 331 are opened, and liquid droplets can be discharged from the nozzles 302. If the piezoelectric element 332 is operated to move the valve body 331 downward, a distal end portion of the valve body 331 abuts against (contacts with) the nozzles 302 so that the nozzles 302 are closed, and no liquid droplets are discharged from the nozzles 302.

Figure 3:
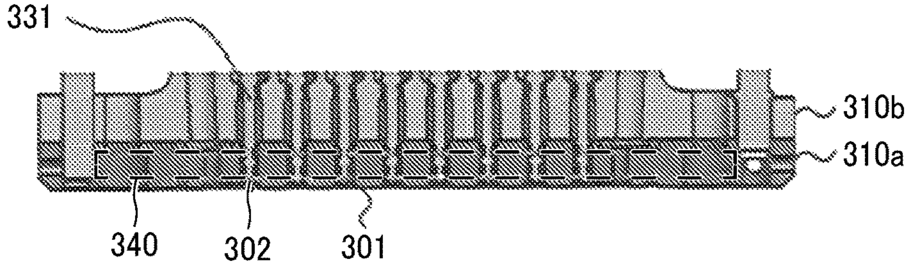
FIG. 3 is an explanatory view illustrating a position of a heating means of the liquid discharge head.

FIG. 3 is an explanatory view illustrating a positional relationship with the heating means of the liquid discharge head 300 according to the present embodiment. The housing 310*a* includes the heater 340 in a vicinity of the nozzles 302. The heater 340 spans across the plurality of nozzles 302 as indicated by a broken line in FIG. 3.

[Thermal Expansion of Liquid discharge Head]

Next, a thermal expansion of the liquid discharge head 300 will be described. In the liquid discharge head 300 in which the piezoelectric element 332 moves the valve body 331 to open and close the nozzles 302, if the piezoelectric element 332 is continuously driven at a high frequency, the piezoelectric element 332 and the valve body 331 thermally expand due to heat generation by the piezoelectric element 332. As described in FIG. 2, the piezoelectric element 332 is fixed to the regulating member 314 at the upper end portion of the piezoelectric element 332 as a securing point. Therefore, the piezoelectric element 332 being thermally expanded extends in a direction of an arrow a4 in FIG. 4A and depresses the valve body 331 toward the nozzle plate 301.

The heat from the piezoelectric element 332 is also transmitted to the valve body 331 contacting the piezoelectric element 332, and the valve body 331 extends in a direction of an arrow a4 by thermal expansion. As a result, a distal end portion 331*a* of the valve body 331 is pushed into the nozzle plate 301 in a contact portion between the distal end portion 331*a* and the nozzle plate 301.

The amount by which the valve body 331 is displaced by the operation of the piezoelectric element 332 is constant, so that, when an extent to which the distal end portion 331*a* of the valve body 331 is pushed into the nozzle plate 301 is large, it is more difficult to open the nozzles 302. For example, when no thermal expansion occurs, the valve body 331 rises by a predetermined amount by the operation of the piezoelectric element 332, and an appropriate gap is formed between the nozzle plate 301 and the distal end portion 331*a* of the valve body 331. The liquid in the channel 312 passes through this gap and can be discharged from the nozzles 302.

However, in a state where the distal end portion 331*a* of the valve body 331 is pushed into the nozzle plate 301 by the thermal expansion, even if the valve body 331 rises by a predetermined amount, it is not possible to obtain an appropriate gap between the nozzle plate 301 and the valve body 331. The gap between the nozzle plate 301 and the valve body 331 is narrower than an appropriate value, and the fluid resistance of the liquid increases, so that a discharge speed of the liquid droplets from the nozzles 302 also decreases, which makes it impossible to obtain a desired appropriate discharge amount.

The housing 310 does not contact the piezoelectric element 332, and thus, the housing 310 does almost not thermally expand by the heat from the piezoelectric element 332. That is, while the piezoelectric element 332 and the valve body 331 expand by the thermal expansion inside the housing 310, the housing 310 and the nozzle plate 301 are almost not affected by the thermal expansion due to the heat from the piezoelectric element 332. Such a difference in thermal expansion also causes positional deviation in the relative positions of the nozzles 302 and the valve body 331 in a horizontal direction.

In addition, the nozzle plate 301 and the housing 310*a* may also expand or contract in accordance with an ambient temperature around the head. If the housing 310*a* expands or contracts, similarly to the case where the piezoelectric element 332 generates heat, it is not possible to obtain an appropriate gap between the nozzle plate 301 and the distal end portion 331*a* of the valve body 331 and to obtain a desired appropriate discharge amount.

As described above, in the present embodiment, the liquid discharge head 300 includes the nozzle plate 301 including the nozzles 302 that discharge liquid droplets, the valve body 331 that opens and closes the nozzles 302, the piezoelectric element 332 that drives the valve body 331, and the housing 310 that holds the nozzle plate 301, the valve body 331, and the piezoelectric element 332. The heater 340 that heats the housing 310 is provided in the vicinity of the nozzles 302 of the housing 310. Thus, it is possible to provide the liquid discharge head 300 that reduces variations in liquid discharge due to temperature changes.

The housing 310 includes the housing 310*a* including the heater 340, and the housing 310*b* having a tubular shape and not including the heater 340. The piezoelectric element 332 is provided in the housing 310*b*. Thus, heat can be intensively supplied to the vicinity of the nozzles 302, and it is possible to improve the responsiveness of position correction of the nozzles 302 with respect to the valve body 331.

The housing 310*a* is formed of a metal, and the housing 310*b* is formed of a resin. Thus, the temperature around the nozzles 302 can be easily increased, and it is possible to further improve the responsiveness of the position correction of the nozzles 302.

First Embodiment

Next, a first embodiment of the liquid discharge module 330 will be described with reference to FIG. 4A. The housing 310*b* includes a compression spring 366 arranged in a lower end portion of the housing 310*b*. The housing 310*b* accommodates, above the compression spring 366, a holding body 370 that holds the piezoelectric element 332. The compression spring 366 urges the holding body 370 upward.

To improve the responsiveness of the position correction of the nozzles 302, it is preferable to use the configuration described above. However, instead of this configuration, the housing 310*a* and the housing 310*b* may be formed as a single member. Further, the housing 310*a* and the nozzle plate 301 may be formed as a single member.

The valve body 331 is supported at one end portion of the holding body 370 in the longitudinal direction. In the outer periphery of a shaft portion of the valve body 331, O-rings 316 are mounted in a two-stage structure including an upper and a lower O-ring, to prevent leakage of high-pressure ink.

A fixing member 361 against which the other end portion in the longitudinal direction of the holding body 370 holding the piezoelectric element 332 abuts (contacts) is accommodated at an upper end portion of the housing 310*b*. The fixing member 361 is formed with a slotted groove 361*b* extending in the longitudinal direction from an upper end portion of the fixing member 361. On one side of the slotted groove 361*b*, a female screw hole 361*c* is formed to penetrate in a lateral direction, and on the opposite side of the slotted groove 361*b*, a blind hole 361*d* having no thread is formed.

A set screw 380 as an expansion member or a screw member is screwed into the female screw hole 361*c* to span across the slotted groove 361*b* in the lateral direction. A distal end portion 380*a* of the set screw 380 abuts against (contacts with) a bottom portion of the blind hole 361*d*. The housing 310*b* is formed with a clearance hole 310*b*3 for inserting the set screw 380.

Note that the screw member is not limited to the set screw 380. If there is room in the layout, a gap may be provided to prevent the screw member from sitting on the housing 310*b*, and a screw including a screw head such as a pan-head screw or a binding screw may be used. Further, any member that has a function of enlarging the slotted groove 361*b* in the lateral direction can be used without being limited to the screw member.

The position adjustment of the fixing member 361 in an up-down direction and the position fixing of the fixing member 361 with respect to the housing 310*b* are performed as described below. First, the position of the fixing member 361 in the up-down direction is adjusted in a state where the set screw 380 is loosened in FIG. 4A. Subsequently, the set screw 380 is tightened in the direction of an arrow illustrated in FIG. 4A, and the distal end portion 380*a* of the set screw 380 presses against the bottom portion of the blind hole 361*d*. Therefore, the gap of the slotted groove 361*b* expands as illustrated by the direction of arrows in FIG. 4A, and an outer peripheral surface of the fixing member 361 is pressed against an inner peripheral surface of the housing 310*b*.

Figure 9A:
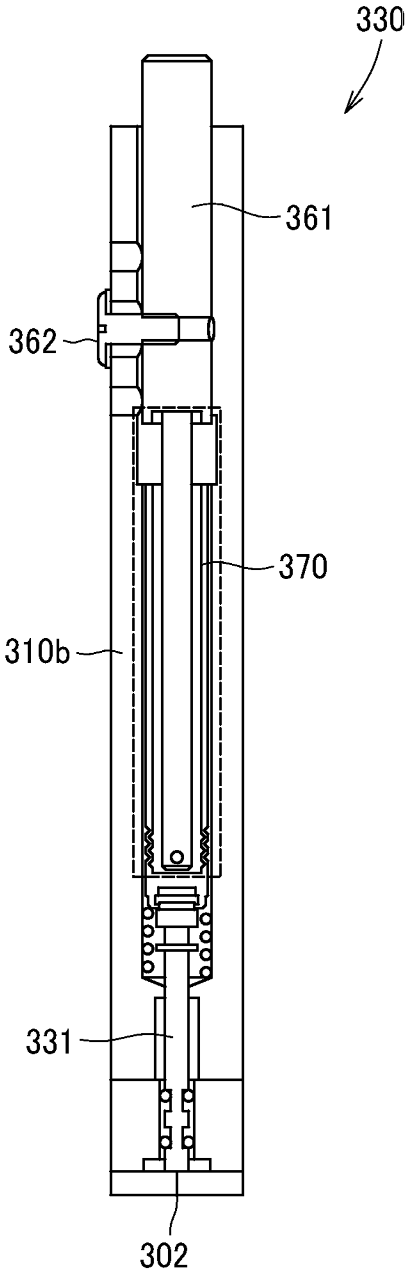
FIGS. 9A and 9B illustrate cross-sectional views of a conventional liquid discharge module.
Figure 9B:
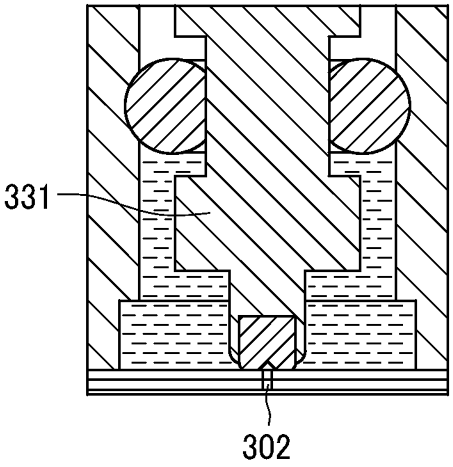

Thus, it is possible to fix the position of the fixing member 361 with respect to the housing 310*b*. Thereby, the positions of the holding body 370 and the valve body 331 in an axial direction with respect to the housing 310*b* are determined with high accuracy. When the set screw 380 is tightened, the set screw 380 does not contact the housing 310*b* at all, so that no reaction force caused by such a contact is exerted on the fixing member 361. Therefore, there is no influence on the displacement amount (stroke) of the valve body, unlike in a case where the position is fixed by a bolt 362 in FIG. 9A.

Figure 10A:
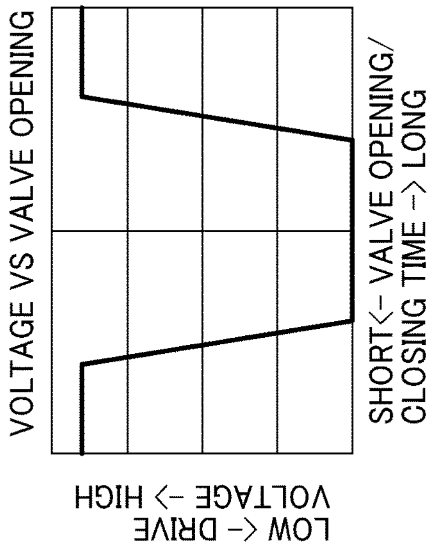
FIGS. 10A to 10C are graphs for explaining variations in liquid discharge flow rates due to variations in a displacement amount of a valve body. The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.
Figure 10B:
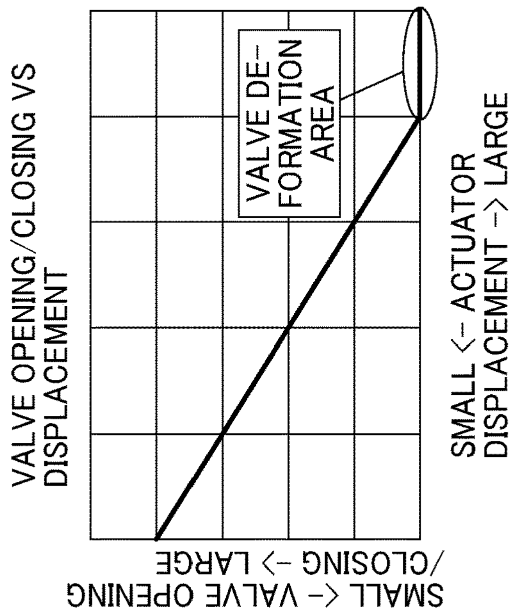
Figure 10C:
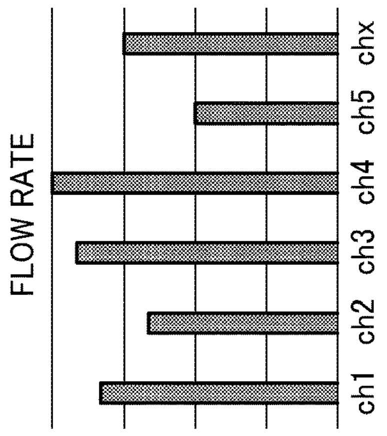

Therefore, it is possible to reduce variations in liquid discharge flow rates between channels as illustrated in FIG. 10C. In addition, by reducing the variations in discharge flow rates between channels, it is also possible to improve convenience such as shortening an initial image adjustment time and shortening the adjustment time during head replacement.

Second Embodiment

Figure 4A:
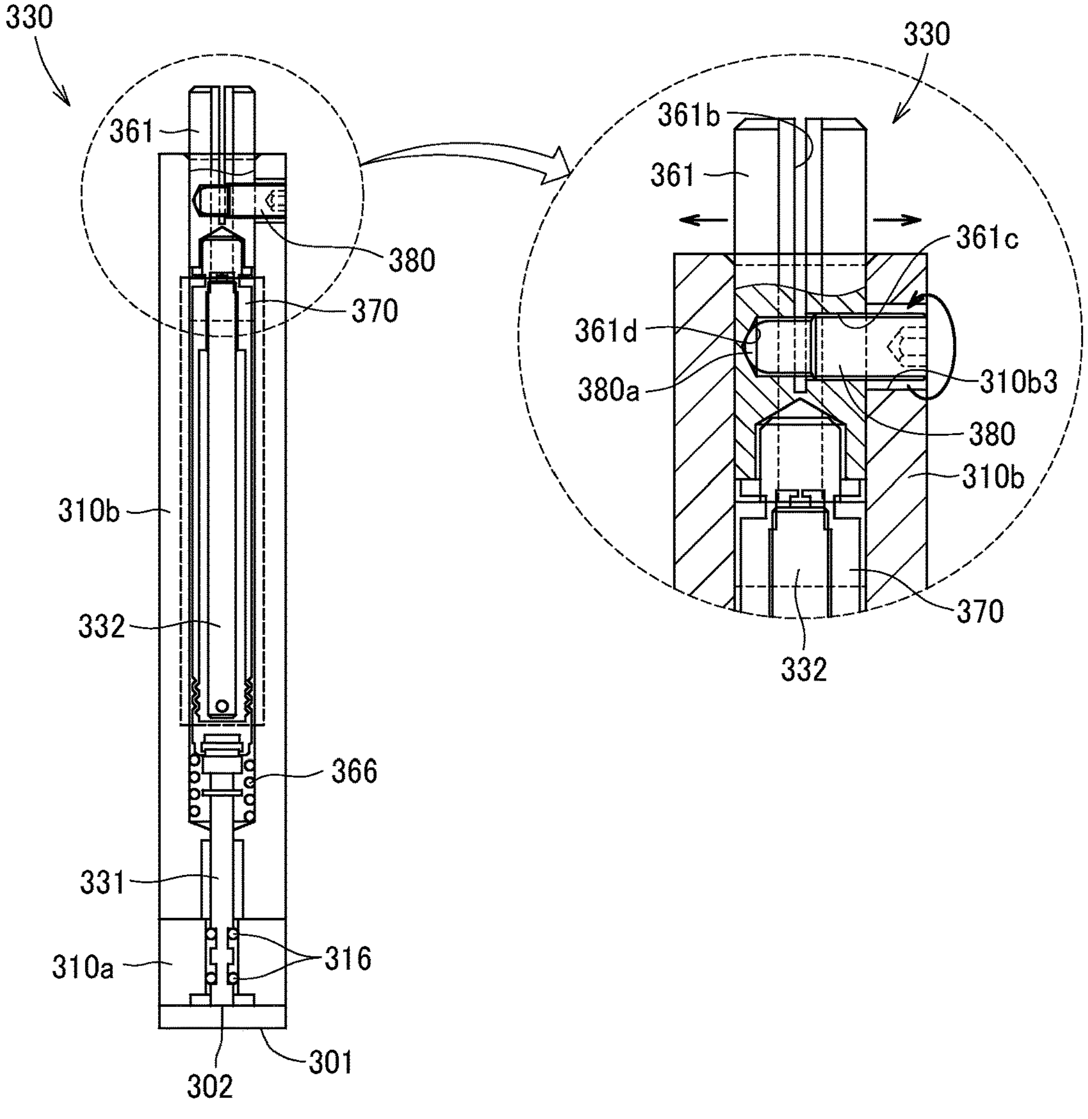
FIG. 4A is a cross-sectional view of a liquid discharge module according to a first embodiment.
Figure 4B:
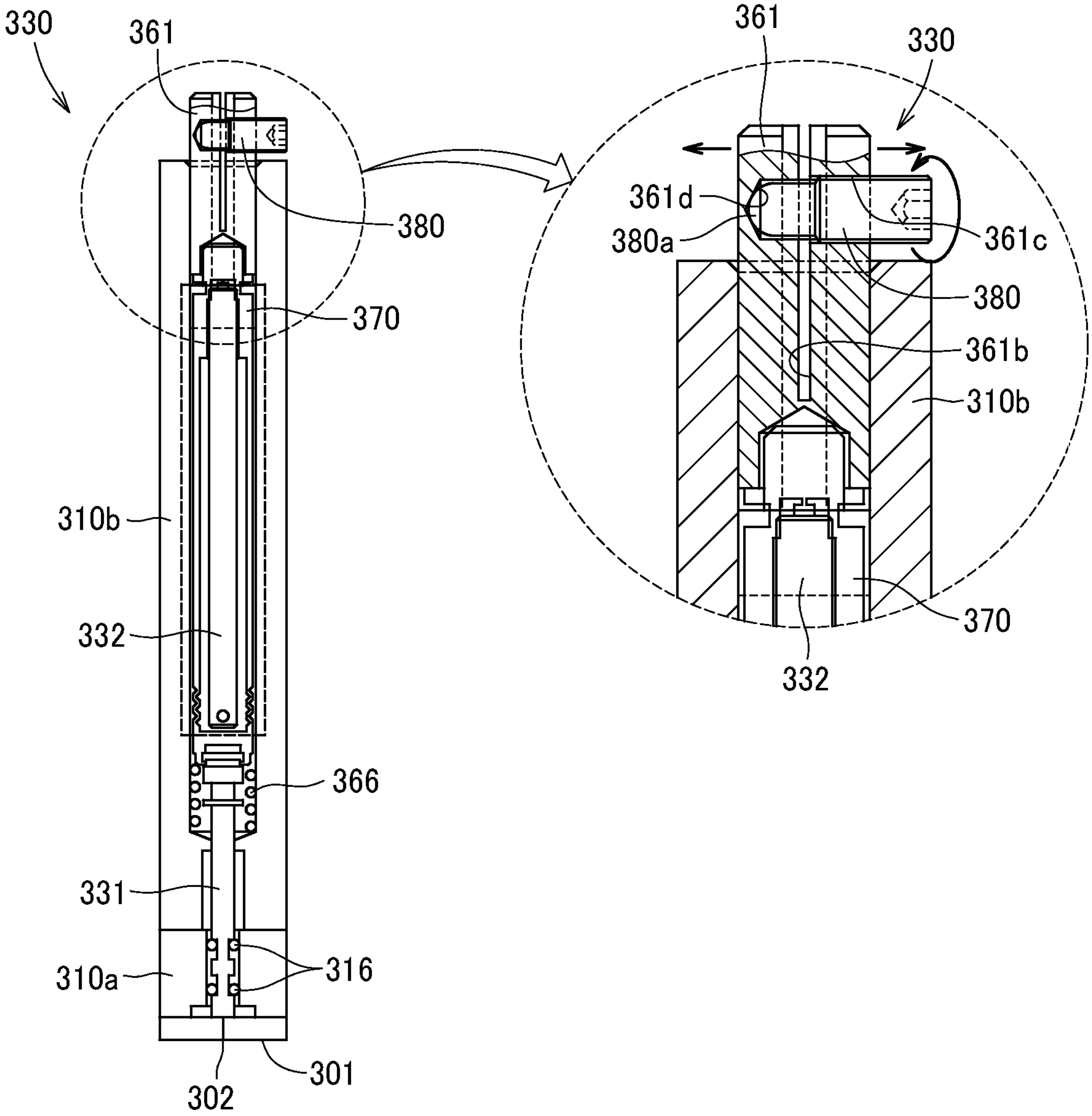
FIG. 4B is a cross-sectional view of a liquid discharge module according to a second embodiment.

In FIG. 4A, the set screw 380 is screwed, through the clearance hole 310*b*3 of the housing 310*b*, into the fixing member 361 to span across the slotted groove 361*b*. However, as illustrated in FIG. 4B, the set screw 380 may be screwed into the fixing member 361 outside the housing 310*b*. In this case, a clearance hole may not be provided in the housing 310*b*. The effect of enlarging the slotted groove 361*b* by tightening the set screw 380 is similar to that in FIG. 4A.

Third Embodiment

Figure 4C:
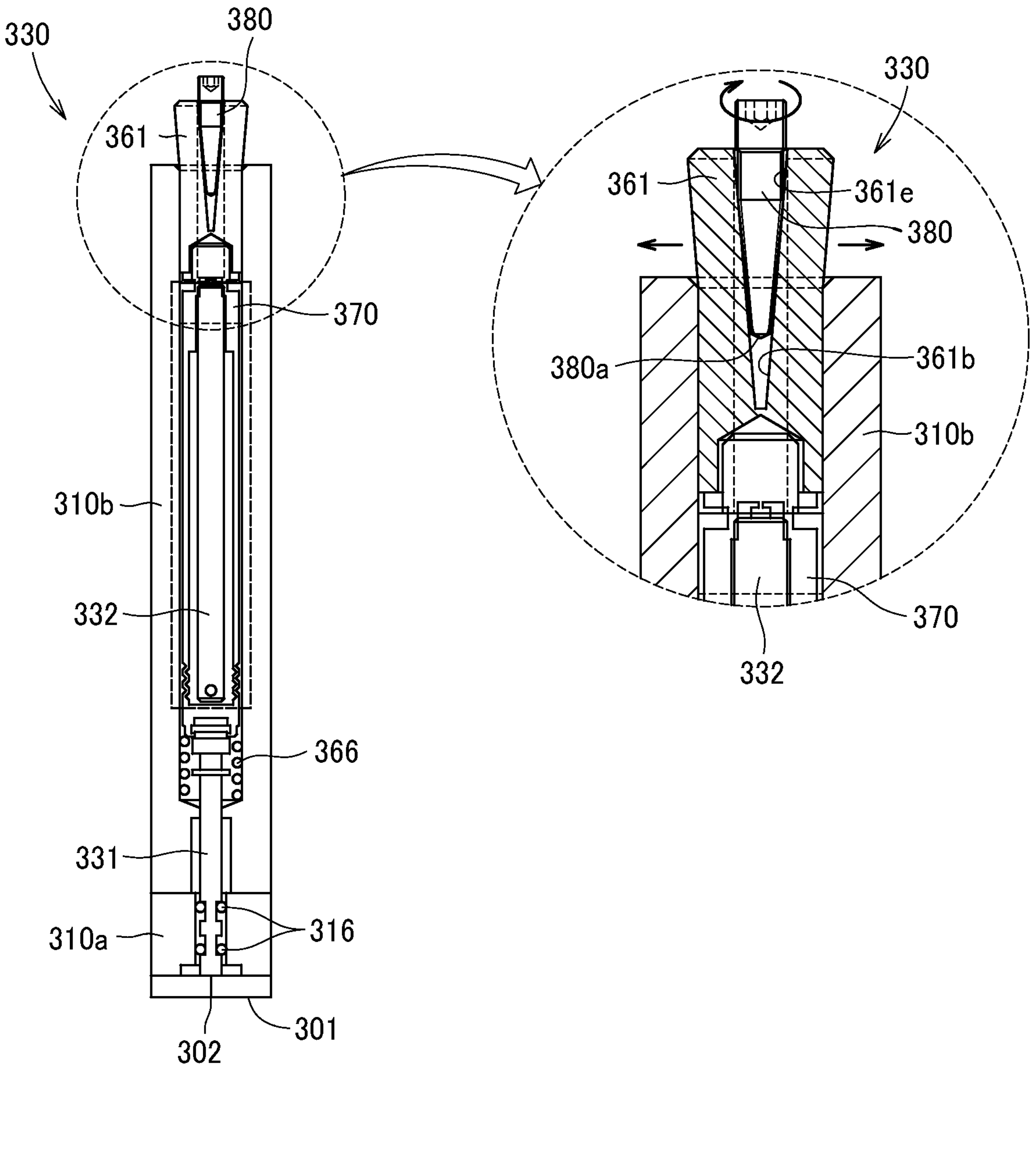
FIG. 4C is a cross-sectional view of a liquid discharge module according to a third embodiment.

In FIG. 4C, the inner surface of the slotted groove 361*b* is formed with a female screw hole 361*e* in the longitudinal direction (the up-down direction), and the set screw 380 having a tapered shape (i.e., tapered screw member) is screwed into the female screw hole 361*e*. The set screw 380 is thinner toward the distal end and has a larger diameter toward a proximal end portion, and thus, when the set screw 380 is screwed into the female screw hole 361*e*, the slotted groove 361*b* expands in a left-right direction. Similarly to FIGS. 4A and 4B, it is possible to fix the fixing member 361 to the housing 310*b*, without causing the set screw 380 to contact the housing 310*b*. Thereby, the positions of the holding body 370 and the valve body 331 in the axial direction with respect to the housing 310*b* are determined with high accuracy.

Fourth Embodiment

Figure 5:
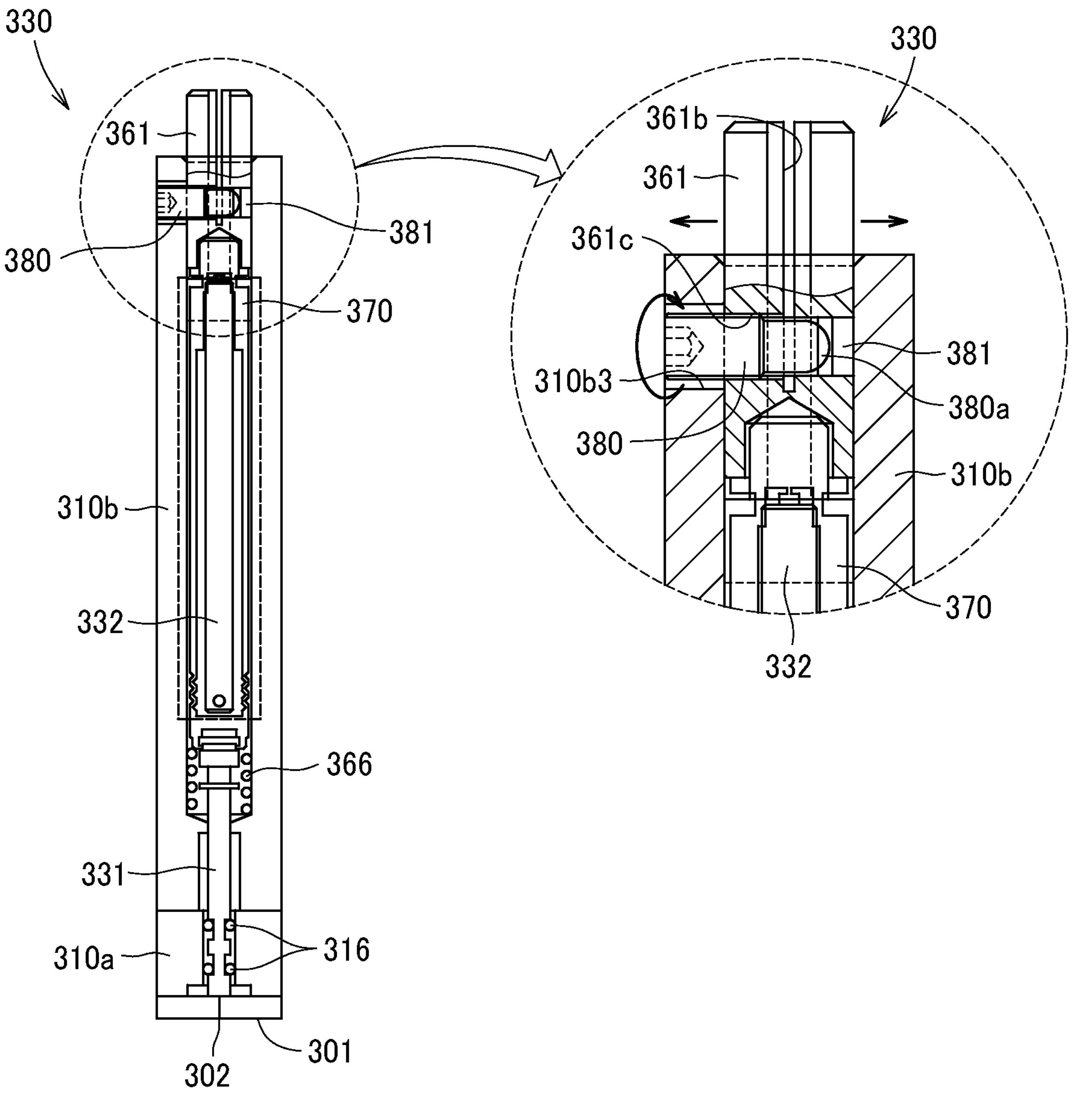
FIG. 5 is a cross-sectional view of a liquid discharge module according to a fourth embodiment.

In FIG. 5, a through hole for the set screw 380 is formed in a direction crossing the slotted groove 361*b* of the fixing member 361. The female screw hole 361*c* is formed on one side of the slotted groove 361*b*, and a through hole having no female screw hole is formed on the opposite side of the slotted groove 361*b*. The through hole having no female screw hole accommodates an abutment plate 381 serving as an abutted member. The abutment plate 381 is accommodated in the through hole portion to be rotatable in a rotation direction of the set screw 380. The abutment plate 381 may be formed of a copper alloy-based material, or may be formed of stainless steel, iron, aluminum alloy, or the like depending on the application, the characteristics, and the like of the product.

When the set screw 380 is tightened and the distal end portion 380*a* of the set screw 380 abuts against (contacts with) the abutment plate 381 and presses against a rear surface of the abutment plate 381, a front surface of the abutment plate 381 is pressed against an inner surface of the housing 310*b*. Thus, similarly as in the above-described embodiment, the slotted groove 361*b* expands in the direction of the arrows (left-right direction), and the fixing member 361 can be fixed to the housing 310*b*. Thereby, the positions of the holding body 370 and the valve body 331 in the axial direction with respect to the housing 310*b* are determined with high accuracy.

The abutment plate 381 is configured to be rotatable in the rotation direction of the set screw 380, so that, when tightening the set screw 380, it is possible to prevent a fastening force from propagating to the housing 310*b*. Therefore, when the fixing member 361 is pressed against and fixed to the housing 310*b* by the set screw 380, it is possible to prevent a deviation in a positional relationship between the housing 310*b* and the fixing member 361.

Fifth Embodiment

Figure 6A:
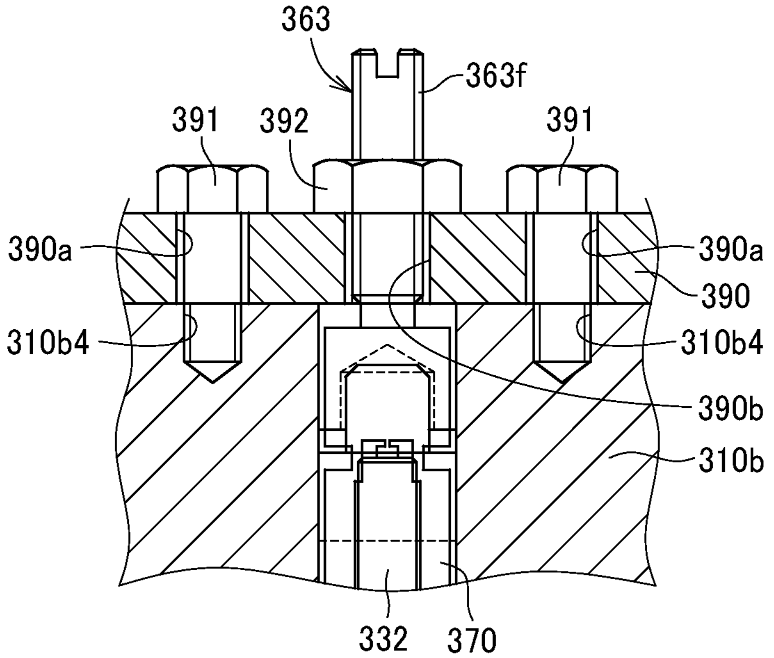
FIG. 6A is a cross-sectional view of a liquid discharge module according to a fifth embodiment.
Figure 6B:
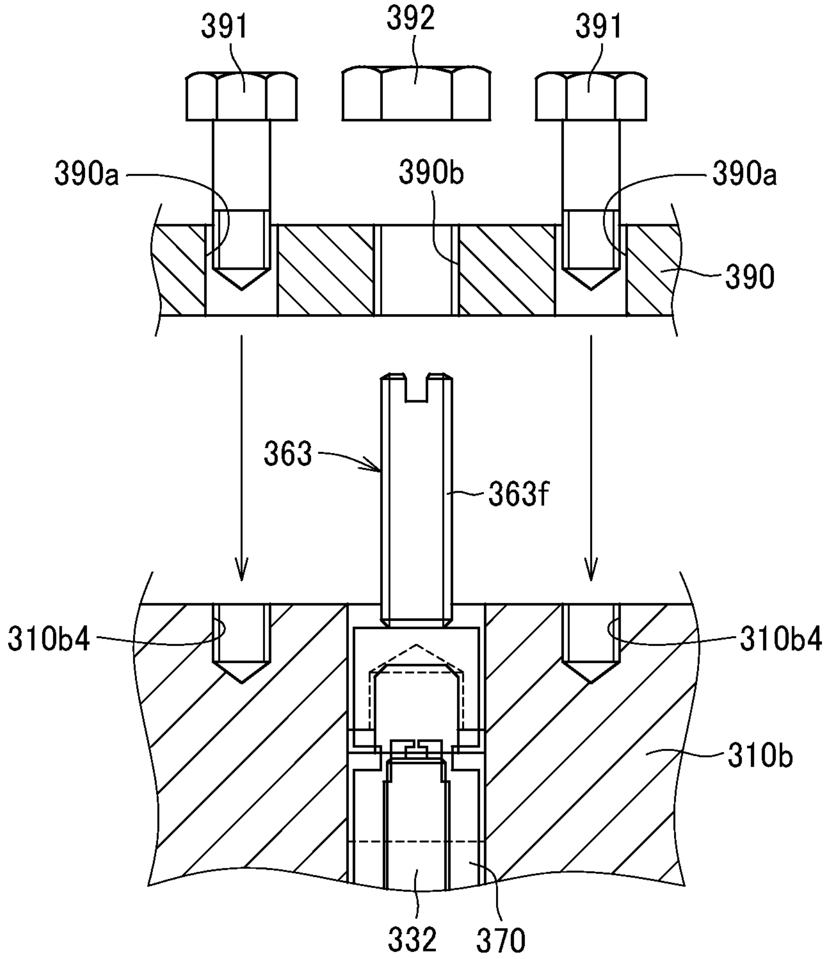
FIG. 6B is an exploded view of the liquid discharge module according to the fifth embodiment.

FIGS. 6A and 6B illustrate a configuration in which a position of a screwed member 363 is fixed by using a second fixing member 390 having a plate shape, without using the slotted groove 361*b* or the set screw 380. The screwed member 363 has a function equivalent to that of the fixing member 361 described above. That is, when the other end portion of the holding body 370 in the longitudinal direction abuts against (contacts with) the screwed member 363, the positions of the holding body 370 and the valve body 331 in the axial direction with respect to the housing 310*b* are determined with high accuracy. That is, a male screw portion 363*f* extending outward in the longitudinal direction is formed at the upper end (e.g., outer portion) of the screwed member 363, and the male screw portion 363*f* is screwed into a female screw hole 390*b* of the second fixing member 390.

The second fixing member 390 includes a plurality of clearance holes 390*a* formed around the female screw hole 390*b*. The second fixing member 390 is fixed to the housing 310*b* by screwing distal ends of bolts 391 inserted into the clearance holes 390*a* into female screw holes 310*b*4 of the housing 310*b*.

By rotating the screwed member 363, it is possible to adjust the position of the screwed member 363 in the up-down direction. After positioning the screwed member 363, a nut 392 is screwed onto a male screw portion to lock the screwed member 363. Thus, even when the position of the screwed member 363 is fixed by using the second fixing member 390, no force acts on the housing 310*b* when the nut 392 is tightened, so that the position of the screwed member 363 does not deviate. Therefore, it is possible to prevent any influence on the displacement amount (stroke) of the valve body.

Sixth Embodiment

Figure 7:
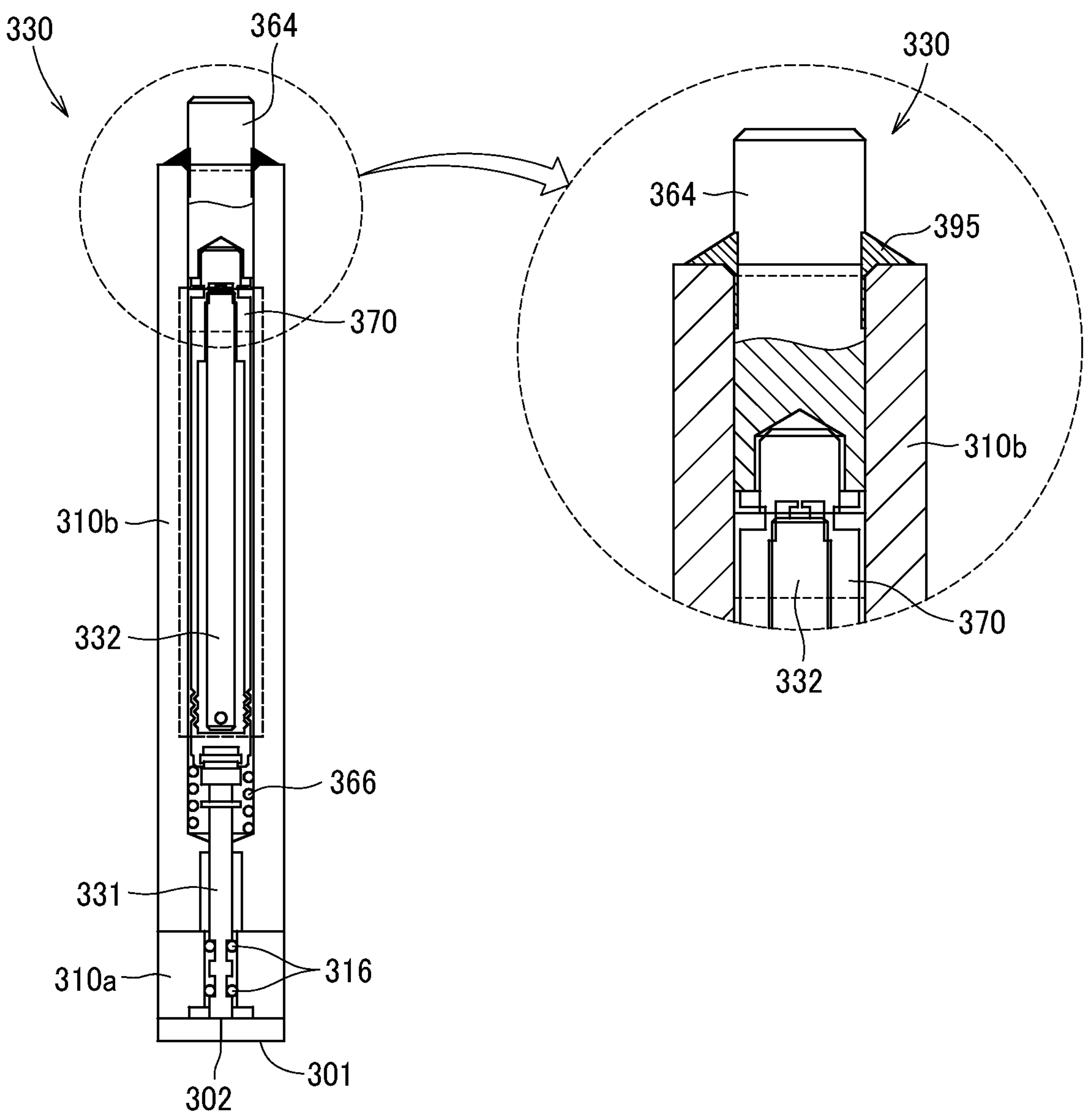
FIG. 7 is a cross-sectional view of a liquid discharge module according to a sixth embodiment.

A sixth embodiment illustrated in FIG. 7 is different from the above-described embodiments in that an adhered member 364 is directly fixed to the housing 310*b* by an adhesive 395, without using a special member. The adhered member 364 has a function equivalent to that of the fixing member 361 described above, and no force acts on the housing 310*b* when the adhered member 364 adheres to the housing 310*b*, so that it is possible to position the adhered member 364 in the axial direction with high accuracy.

Thus, the positions of the holding body 370 and the valve body 331 in the axial direction with respect to the housing 310*b* are also determined with high accuracy. The adhesive 395 is used, and thus, once the adhered member 364 is fixed, it is difficult to remove the adhered member 364, but there is the advantage that the position of the adhered member 364 can be fixed simply and at low cost.

If an epoxy-based adhesive is used as the adhesive 395 used for adhesive fixation, it is possible to obtain strength, weather resistance, and the like. Many of Epoxy-based adhesives are preferably cured at high temperatures and during a long time. Therefore, if sufficient strength, weather resistance, and the like are obtained, a UV adhesive or an anaerobic adhesive by which a bonding strength is achieved in a short period of time may be employed.

[Liquid Discharge Apparatus]

Figure 8B:
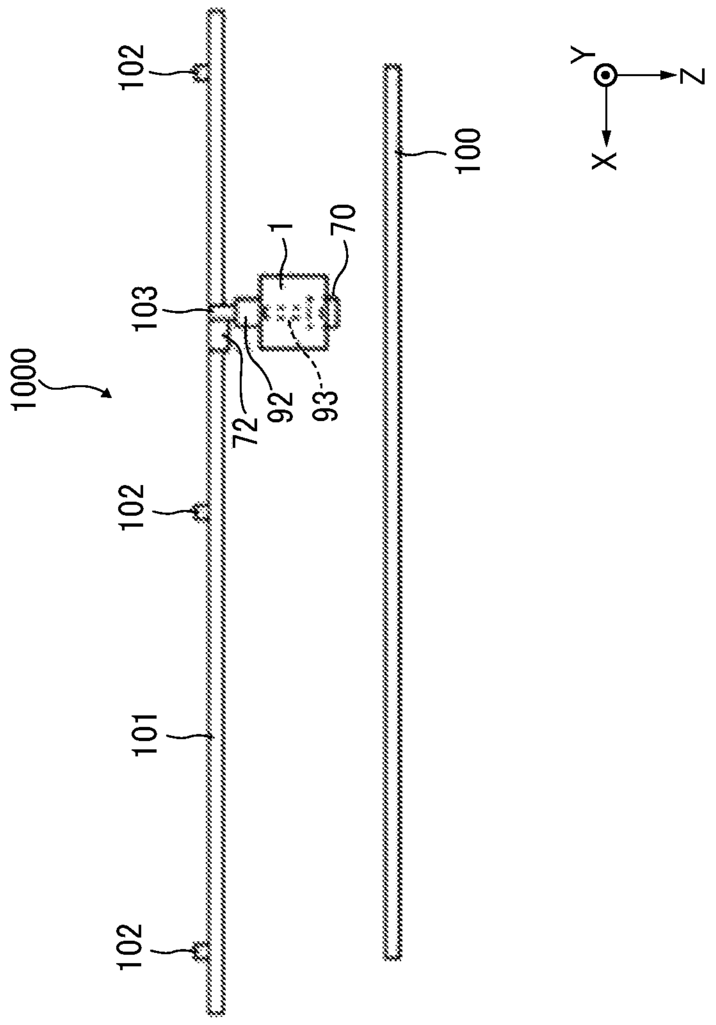
FIGS. 8A and 8B illustrate schematic views of an overall configuration of a liquid discharge apparatus.
Figure 8A:
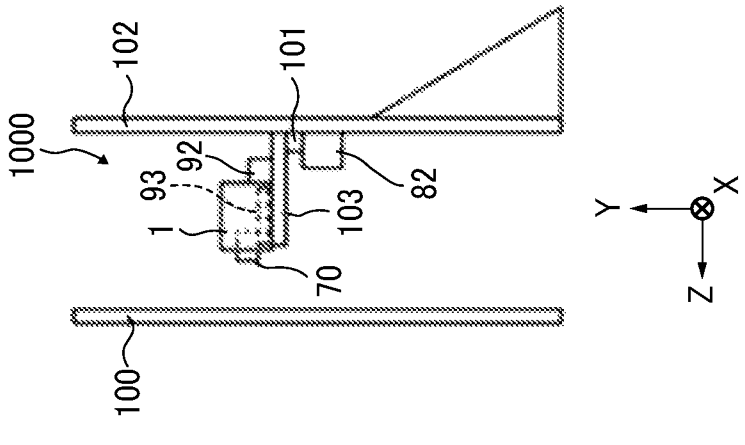

FIGS. 8A and 8B are schematic views of an overall configuration of a liquid discharge apparatus 1000 using the liquid discharge module 330 described above. FIG. 8A is a side view of the liquid discharge apparatus, and FIG. 8B is a plan view of the liquid discharge apparatus. The liquid discharge apparatus 1000 is installed to face an object to be drawn 100 which is an example of a target object. The liquid discharge apparatus 1000 includes an X-axis rail 101, a Y-axis rail 102 intersecting the X-axis rail 101, and a Z-axis rail 103 intersecting the X-axis rail 101 and the Y-axis rail 102.

The Y-axis rail 102 holds the X-axis rail 101 so that the X-axis rail 101 is movable in a Y-axis direction. The X-axis rail 101 holds the Z-axis rail 103 so that the Z-axis rail 103 is movable in an X-axis direction. The Z-axis rail 103 holds a carriage 1 so that the carriage 1 is movable in a Z-axis direction.

The liquid discharge apparatus 1000 includes a first Z-direction driving portion 92 that moves the carriage 1 in the Z-axis direction along the Z-axis rail 103, and an X-direction driving portion 72 that moves the Z-axis rail 103 in the X-axis direction along the X-axis rail 101. The liquid discharge apparatus 1000 further includes a Y-direction driving portion 82 that moves the X-axis rail 101 in the Y-direction along the Y-axis rail 102. Further, the liquid discharge apparatus 1000 includes a second Z-direction driving portion 93 that moves a head holding body 70 in the Z-axis direction with respect to the carriage 1.

The liquid discharge head 300 described in the first to fourth embodiments described above is used in a state where the liquid discharge head 300 is attached to the head holding body 70 so that the nozzles 302 of the head 300 face the object to be drawn 100. In the liquid discharge apparatus 1000 configured as described above, the carriage 1 is moved in the directions of the X-axis, the Y-axis, and the Z-axis, while ink, which is an example of a liquid, is ejected from the head 300 attached to the head holding body 70 toward the object to be drawn 100 to draw an image on the object to be drawn 100.

A "liquid discharge apparatus" may include a robot arm movable in parallel with the three directions of the X-axis, the Y-axis, and the Z-axis and rotatable around each of the X-axis, the Y-axis, and the Z-axis, and a liquid discharge head may be attached to the distal end of the robot arm. In such a configuration, the robot arm is moved in parallel with or rotated around the object to be drawn, while liquid droplets are discharged from the liquid discharge head toward the object to be drawn, to draw an image on the object to be drawn.

The "liquid discharge apparatus" described above is not limited to an apparatus for discharging liquid to visualize meaningful images, such as letters or figures. For example, the liquid discharge apparatus also includes an apparatus for forming patterns, uniformly painted films, and the like that do not have inherent meaning, or an apparatus for fabricating three-dimensional images.

The present embodiment has been described above. However, the present embodiment is not limited to the above-described embodiment, and various modifications are possible, based on the technical idea described in the claims. For example, the piezoelectric element 332 may be replaced by another driving body that expands and contracts in the longitudinal direction. For example, instead of the piezoelectric element 332, a piston that expands and contracts in the longitudinal direction by an electromagnetic solenoid may be employed.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations maybe performed in various other ways, for example, in an order different from the one described above.

REFERENCE SIGNS LIST

1: Carriage
70: Head holding body
72: X-direction driving portion
82: Y-direction driving portion
92: First Z-direction driving portion
93: Second Z-direction driving portion
100: Object to be drawn
101: X-axis rail
102: Y-axis rail
103: Z-axis rail
300: Liquid discharge head

301: Nozzle plate
302: Nozzle
310: Housing
310*a*: Housing
310*b*: Housing
310*b*3: Clearance hole
310*b*4: Female screw hole
311: Supply port
312: Channel
313: Collection port
314: Regulating member
315: Sealing member
316: O-ring
330: Liquid discharge module
331: Valve body
331*a*: Distal end portion
332: Piezoelectric element (driving body)
340: Heater
350: Connector
361: Fixing member or fixed structure
361*b*: Slotted groove
361*c*: Female screw hole
361*d*: Blind hole
361*e*: Female screw hole
362: Bolt
363: Screwed member or screwed structure
363*a*: Male screw portion
364: Adhered member or adhered structure
366: Compression spring
370: Holding body
380: Set screw (screw member, screw, expansion member, expander)
380*a*: Distal end portion
381: Abutment plate
390: Second fixing member or second fixed structure
390*a*: Clearance hole
390*b*: Female screw hole
391: Bolt
392: Nut
395: Adhesive
1000: Liquid discharge apparatus

The invention claimed is:

1. A liquid discharge module, comprising:
a valve body to open and close a nozzle;
a driving body to expand and contract in a longitudinal direction of the driving body;
a holding body holding the driving body and supporting the valve body at one end of the holding body in the longitudinal direction;
a housing having a cylindrical shape and accommodating the holding body;
a fixed structure contacting another end of the holding body in the longitudinal direction and including a slotted groove having a gap extending in the longitudinal direction, the fixed structure fixed to the housing; and
an expander to widen the gap of the slotted groove to fix an outer peripheral face of the fixed structure to an inner peripheral face of the housing.

2. The liquid discharge module according to claim 1, wherein the expander includes a screw screwed into the fixed structure across the slotted groove.

3. The liquid discharge module according to claim 1, wherein:
the slotted groove includes a female screw hole formed in an inner peripheral face of the slotted groove, the female screw hole extending in the longitudinal direction, and
the expander includes a tapered screw screwed into the female screw hole in the longitudinal direction.

4. The liquid discharge module according to claim 1, wherein the driving body is a piezoelectric element.

5. A liquid discharge head comprising the liquid discharge module according to claim 1,
wherein the liquid discharge module comprises multiple liquid discharge modules.

6. A liquid discharge apparatus comprising the liquid discharge module according to claim 1.

7. The liquid discharge module according to claim 1, wherein:
the expander is a screw having a tapered distal end.

8. The liquid discharge module according to claim 1, wherein:
the fixed structure includes a plurality of slotted grooves.

9. The liquid discharge module according to claim 1, further comprising:
a heater in the housing to heat the liquid.

10. The liquid discharge module according to claim 1, wherein:
the housing comprises a first housing of high thermal conductivity and a second housing of low thermal conductivity.

11. The liquid discharge module according to claim 1, wherein:
the driving body is elastically held in a compressed state by the holding body.

12. The liquid discharge module according to claim 1, wherein:
the slotted groove gap extends only partially through a longitudinal length of the fixed structure.

13. The liquid discharge module according to claim 1, wherein:
the expander widen the gap by being driven in the longitudinal direction into the slotted groove.

14. The liquid discharge module according to claim 1, wherein:
the valve body comprises a distal end portion to seal against a nozzle plate.

15. A liquid discharge head comprising a plurality of the liquid discharge modules according to claim 1 arranged in a row.

16. The liquid discharge head according to claim 15, further comprising:
a common channel supplying liquid to the plurality of liquid discharge modules.

17. A liquid discharge apparatus comprising the liquid discharge head according to claim 15 and a carriage to move the head.

18. The liquid discharge apparatus according to claim 17, further comprising a collection port to collect liquid not discharged by the nozzles.

19. A liquid discharge module, comprising:
a valve body to open and close a nozzle;
a driving body to expand and contract in a longitudinal direction of the driving body;
a holding body holding the driving body and supporting the valve body at one end of the holding body in the longitudinal direction;
a housing having a cylindrical shape and accommodating the holding body;

an adhered structure contacting another end portion of the holding body in the longitudinal direction, and the adhered structure is to be adhered to the housing with an adhesive.

20. The liquid discharge module according to claim 19, wherein the adhesive comprises an epoxy-based adhesive.

* * * * *